United States Patent
Yanagida et al.

(10) Patent No.: US 10,937,318 B2
(45) Date of Patent: Mar. 2, 2021

(54) PARKING ASSISTANCE SERVICE MANAGEMENT DEVICE, CONTROL METHOD FOR SAME, CONTROL METHOD FOR TERMINAL OF USER, AND NON-TRANSITORY COMPUTER-READABLE STORAGE MEDIUM

(71) Applicant: TOYOTA JIDOSHA KABUSHIKI KAISHA, Toyota (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/217,632

(22) Filed: Dec. 12, 2018

(65) Prior Publication Data

US 2019/0189010 A1    Jun. 20, 2019

(30) Foreign Application Priority Data

Dec. 19, 2017   (JP) .................. 2017-243107

(51) Int. Cl.
*G08G 1/14* (2006.01)
*G01C 21/36* (2006.01)
(Continued)

(52) U.S. Cl.
CPC ......... *G08G 1/144* (2013.01); *G01C 21/3438* (2013.01); *G01C 21/3667* (2013.01);
(Continued)

(58) Field of Classification Search
CPC .......... G08G 1/144; G08G 1/14; G06Q 10/02; G01C 21/3685; G01C 21/3667; G01C 21/3438
(Continued)

(56) References Cited

U.S. PATENT DOCUMENTS

| 10,131,321 B1* | 11/2018 | Ahsan ............... G07B 15/02 |
| 2013/0066667 A1* | 3/2013 | Gulec ............... G06Q 10/06 705/7.13 |

(Continued)

FOREIGN PATENT DOCUMENTS

JP    2003-109198    4/2003

*Primary Examiner* — Isaac G Smith
(74) *Attorney, Agent, or Firm* — Oblon, McClelland, Maier & Neustadt, L.L.P.

(57) ABSTRACT

A parking assistance service management device includes a processor configured to receive, from a terminal of a user of a parking assistance service, a use request for using the parking assistance service. The use request includes point information and time information. The processor is configured to extract, in response to the reception of the use request, from a plurality of parking lots, a parking lot that is present within a predetermined range from the point represented by the point information and has an empty parking space at the date and time represented by the time information. The processor is configured to reserve a parking space for the date and time represented by the time information. The information notification unit is configured to notify a terminal of an agent of the parking assistance service and the terminal of the user of reserved parking lot information indicating the reserved parking lot.

17 Claims, 10 Drawing Sheets

(51) Int. Cl.
*G01C 21/34* (2006.01)
*G06Q 10/02* (2012.01)

(52) U.S. Cl.
CPC ......... *G01C 21/3685* (2013.01); *G06Q 10/02* (2013.01); *G06Q 2240/00* (2013.01)

(58) Field of Classification Search
USPC ........................................... 701/117; 705/13
See application file for complete search history.

(56) References Cited

U.S. PATENT DOCUMENTS

| | | | | |
|---|---|---|---|---|
| 2016/0371608 | A1* | 12/2016 | Kahng | G06Q 10/02 |
| 2017/0039784 | A1* | 2/2017 | Gelbart | G07C 5/008 |
| 2017/0191848 | A1* | 7/2017 | Jones | G01C 21/3685 |
| 2017/0351975 | A1* | 12/2017 | Webb | G06Q 10/02 |
| 2019/0035274 | A1* | 1/2019 | Sabagh | G08G 1/144 |

* cited by examiner

FIG. 3

| USER ID | PASSWORD | VEHICLE TYPE | COLOR | NUMBER | VEHICLE IDENTIFICATION NUMBER | KEY UNIT INFORMATION | AUTHENTICATION INFORMATION |
|---|---|---|---|---|---|---|---|
| I001 | AABBCC | ... | WHITE | XXYY | ... | ... | ... |

FIG. 4

| PARKING LOT ID | NAME | FEE | POSITION | SIZE | TYPE | VEHICLE SIZE | EMPTY INFORMATION |
|---|---|---|---|---|---|---|---|
| P001 | A PARKING LOT | 300 YEN / 1h | ... | 120 UNITS | THREE-DIMENSIONAL | VEHICLE HEIGHT 3.5m OR LESS | ... |
| P002 | B PARKING | 250 YEN / 1h | ... | 10 UNITS | FLAT | ... | ... |
| P003 | ... | ... | ... | ... | ... | ... | ... |

PARKING ASSISTANCE SERVICE MANAGEMENT DEVICE, CONTROL METHOD FOR SAME, CONTROL METHOD FOR TERMINAL OF USER, AND NON-TRANSITORY COMPUTER-READABLE STORAGE MEDIUM

INCORPORATION BY REFERENCE

The disclosure of Japanese Patent Application No. 2017-243107 filed on Dec. 19, 2017 including the specification, drawings and abstract is incorporated herein by reference in its entirety.

BACKGROUND

1. Technical Field

The present disclosure relates to a parking assistance service management device for providing a parking assistance service, a control method for the same, a control method for a terminal of a user, and a non-transitory computer-readable storage medium storing a program.

2. Description of Related Art

Techniques have been studied that allow a vehicle operation (such as locking and unlocking, power ON, and engine start) based on a portable device such as a smartphone used in place of a vehicle key. With such techniques, a temporary operation of a vehicle by a person other than the owner of the vehicle (that is, a person without a physical vehicle key) can be realized with ease, and thus new methods for using vehicles and new vehicle-based services can be anticipated. The services include a service in which a person other than the owner (or the driver) of a vehicle moves the vehicle to a nearby parking lot and parks the vehicle in the parking lot (referred to as a "parking assistance service" in this specification).

Indispensable for a smooth parking assistance service operation is a mechanism with which an agent (or a parking assistance service provider) can promptly secure a parking lot near a pick-up place for the vehicle in the event of a parking assistance request from a user. This is because on the user's part, it is more convenient to have his or her car parked as close to himself or herself as possible, and on the agent's or parking assistance service provider's part, an increase in costs such as fuel cost and personnel expenses (time for which the agent remains bound) arises when the car needs to be moved over a long distance for vehicle parking.

Japanese Unexamined Patent Application Publication No. 2003-109198 (JP 2003-109198 A) discloses a system collecting empty parking space information on a parking lot frame basis and providing empty parking space information and allowing parking lot reservation on an Internet website. Still, no parking lot securing mechanism with a parking assistance service as described above has been considered so far.

SUMMARY

The present disclosure provides a parking assistance service management device allowing an agent of a parking assistance service to secure a parking lot in a simplified way, a control method for the same, a control method for a terminal of a user, and a non-transitory computer-readable storage medium storing a program.

The disclosure adopts a configuration in which a parking assistance service management device extracts and reserves an appropriate parking lot and notifies an agent and a user of information on the reserved parking lot.

A first aspect of the disclosure relates to a parking assistance service management device supporting a parking assistance service as a service in which an agent moves a vehicle to a parking lot and parks the vehicle in the parking lot on behalf of a user. The parking assistance service management device includes a processor and an information notification unit. The processor is configured to receive, from a terminal of the user of the parking assistance service, a use request for using the parking assistance service, the use request including point information representing a point of use of the parking assistance service and time information representing a date and time of use of the parking assistance service. The processor is configured to extract, in response to the use request, from a plurality of parking lots, a parking lot that is present within a predetermined range from the point represented by the point information and has an empty parking space at the date and time represented by the time information. The processor is configured to reserve a parking space in the parking lot extracted by the parking lot extraction unit for the date and time represented by the time information. The information notification unit is configured to notify a terminal of the agent of the parking assistance service of reserved parking lot information indicating the reserved parking lot.

According to the first aspect of the disclosure, a parking lot near the point of use of the parking assistance service is extracted and a parking space is reserved for a scheduled date and time of use once the parking assistance service management device receives the use request from the user. Accordingly, on the agent's (parking assistance service provider's) part, the device is advantageous in that a parking lot can be appropriately searched for and reservation processing can be expedited and carried out in a labor-saving manner. In addition, the agent is automatically notified of information on the reserved parking lot, and thus convenience is provided for the agent and the user alike.

In the parking assistance service management device according to the first aspect of the disclosure, the point information may be information representing any one of a destination towards which the user heads, a current location of the user, and a vehicle pick-up place desired by the user. This is because of the following reasons. For example, it is conceivable that a user planning to reach a destination (shopping mall, theme park, or the like) wishes to park his or her car in a parking lot near the destination. Also conceivable is that a user already at a destination wishes to get out of his or her vehicle and deliver the vehicle to be parked from his or her current location. Also possible is that a user designates a convenient place to deliver the vehicle to be parked other than his or her destination and current location.

In the parking assistance service management device according to the first aspect of the disclosure, the terminal of the user may has a function of a car navigation device or a terminal communicable with a car navigation device mounted in the vehicle. The information on at least one of the destination towards which the user heads and the current location of the user may be acquired from the car navigation device. As a result, there is no need for the user to input the information on the destination and the current location and the use application is improved in terms of operability and convenience.

In the parking assistance service management device according to the first aspect of the disclosure, the information notification unit may be configured to notify the terminal of the user of pick-up place information indicating a vehicle pick-up place at which the vehicle is to be picked up. As a result, certainty can be ensured for vehicle delivery between the user and the agent.

In the parking assistance service management device according to the first aspect of the disclosure, the terminal of the user may be a terminal having a function of a car navigation device or a terminal communicable with a car navigation device mounted in the vehicle. The information notification unit may be configured to add the vehicle pick-up place to the car navigation device as a destination or a waypoint by notifying the terminal of the user of the pick-up place information. As a result, (the vehicle of) the user can be guided to the vehicle pick-up place, and the certainty of vehicle delivery between the user and the agent can be enhanced. In addition, car navigation to the delivery place is automatically initiated, which is highly convenient for the user as well.

In the parking assistance service management device according to the first aspect of the disclosure, when a plurality of parking lot candidates satisfies a condition of being present within the predetermined range from the point represented by the point information and having the empty parking space at the date and time represented by the time information, the processor is configured to provide the terminal of the user with information on the parking lot candidates and allows the user to select a desired parking lot. Conditions on which users select parking lots are not limited to "proximity". The conditions differ from person to person, and examples of the conditions include parking fees, the ease of parking, and the presence or absence of a roof. Accordingly, a final decision on parking lots made by a user is expected to add to his or her satisfaction and sense of security, and to help the user feel at ease. In the parking assistance service management device according to the first aspect of the disclosure, the information on the parking lot candidates may include at least one of names of the parking lots, parking fees, positions of the parking lots, and distances between the parking lots and the point represented by the point information.

A second aspect of the disclosure relates to control method for a parking assistance service management device supporting a parking assistance service as a service in which an agent moves a vehicle to a parking lot and parks the vehicle in the parking lot on behalf of a user. The control method includes receiving, from a terminal of the user of the parking assistance service, a use request for using the parking assistance service, the use request including point information representing a point of use of the parking assistance service and time information representing a date and time of use of the parking assistance service, extracting, in response to the use request, from a plurality of parking lots, a parking lot that is present within a predetermined range from the point represented by the point information and has an empty parking space at the date and time represented by the time information, reserving a parking space in the extracted parking lot for the date and time represented by the time information, notifying a terminal of the agent of the parking assistance service and the terminal of the user of reserved parking lot information indicating the reserved parking lot.

A third aspect of the disclosure relates to a non-transitory computer-readable storage medium storing a program for causing a computer to operate as the parking assistance service management device according to the first aspect.

A fourth aspect of the disclosure relates to a control method for a terminal of a user. The terminal is communicable via a network with the parking assistance service management device according to the first aspect of the disclosure. The control method includes acquiring, from a car navigation device, information on a destination towards which the user heads or a current location of the user, generating a use request for using the parking assistance service. The use request including the information on the destination towards which the user heads or the current location of the user as the point information. The control method further comprises transmitting the use request to the parking assistance service management device.

A fifth aspect of the disclosure relates to a control method for a terminal of a user. The terminal is communicable via a network with the parking assistance service management device according to the first aspect of the disclosure. The control method includes generating a use request for using the parking assistance service, the use request including point information and time information, transmitting the use request to the parking assistance service management device, receiving information related to the reserved parking lot from the parking assistance service management device, and displaying information related to the use request and the information related to the reserved parking lot.

A sixth aspect of the disclosure relates to a non-transitory computer-readable storage medium storing a program for causing a computer to execute the control method according to the fourth and fifth aspects.

It is to be noted that the disclosure can be regarded as, for example, a parking assistance service management device, a parking assistance system, and a (user or agent) terminal having at least a part of the above configuration or function. The disclosure can also be regarded as, for example, a parking assistance service management device control method, a parking assistance service management method, and a terminal control method including at least a part of the above processing. The disclosure can also be regarded as, for example, a program for causing a computer to execute the above-described method and a computer-readable recording medium in which the above program is non-temporarily recorded. Each of the above-described configurations and processing can be combined with each other to constitute the disclosure insofar as no technical inconsistency arises.

According to the aspects of the disclosure, a parking assistance service management device allowing an agent of a parking assistance service to secure a parking lot in a simplified way, a control method for the same, a control method for a terminal of a user, and a non-transitory computer-readable storage medium storing a program can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a diagram illustrating an example of information registered in a user information DB;

FIG. 4 is a diagram illustrating an example of information registered in a parking lot information DB;

DETAILED DESCRIPTION OF EMBODIMENTS

The disclosure relates to a technique for supporting a "parking assistance service" in which a parking agent moves a vehicle to a nearby parking lot and parks the vehicle in the parking lot on behalf of the owner (or driver) of the vehicle. More particularly, the disclosure is to provide a mechanism allowing a parking agent to secure a parking lot in a simplified way. When a person visits a large shopping mall, a theme park, an event venue, or the like by car, a parking lot at that site may be full or there may be a long parking queue. In addition, it may take time to find a parking lot around the destination. By using the parking assistance service in the above case, a user can immediately go to his or her destination simply by handing his or her car to a parking agent, and then the user does not have to waste time for parking. When there is a mechanism allowing a vehicle operation (such as locking and unlocking, power ON, and engine start) based on a portable device such as a smartphone, vehicle driving and parking by a third party with no physical vehicle key can be realized with ease, and then more needs for the parking assistance service can be anticipated.

First Embodiment

A first embodiment will be described below with reference to accompanying drawings.

System Overview

Figure 1:
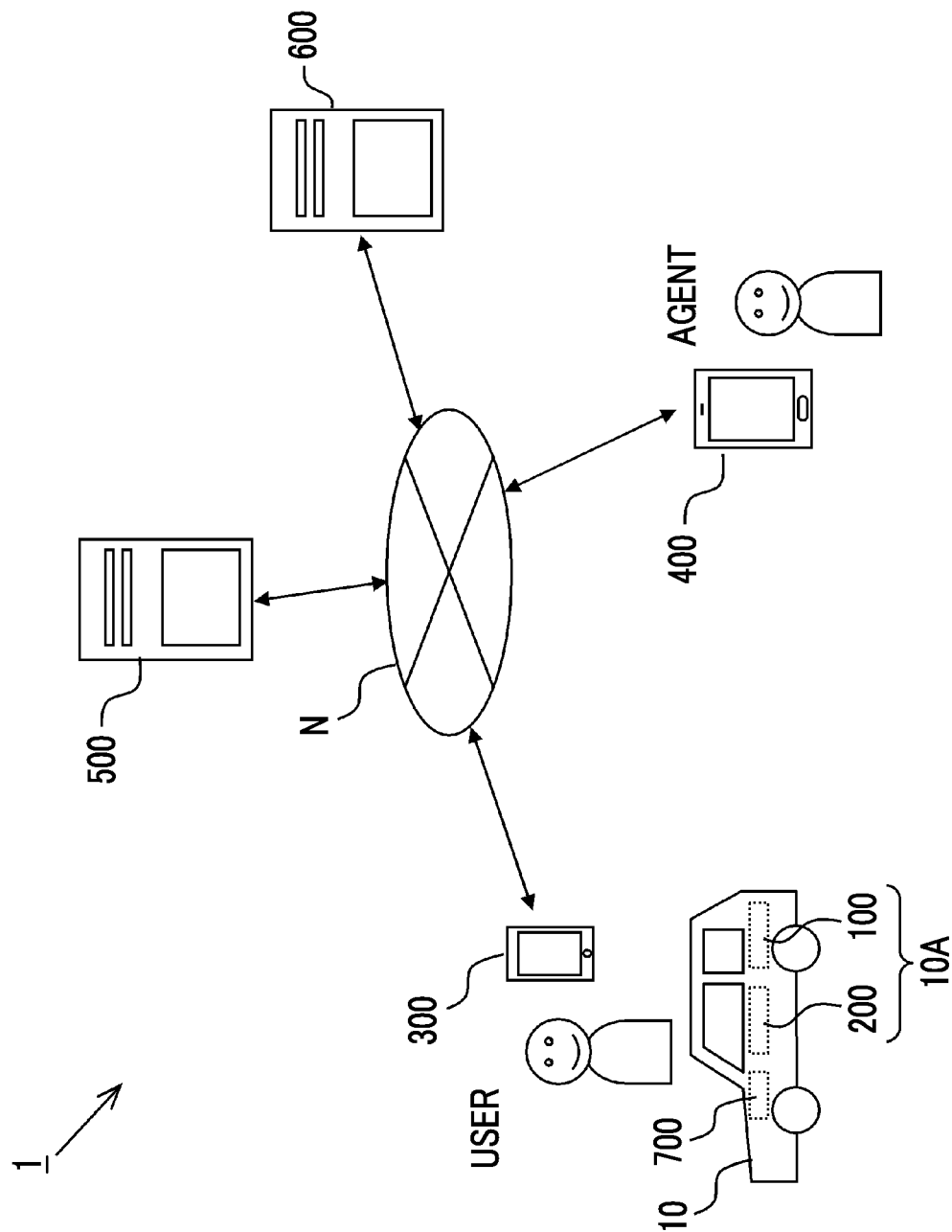
FIG. 1 is a diagram illustrating a schematic configuration of a parking assistance system according to a first embodiment.

The configuration of a parking assistance system according to the first embodiment will be described below. FIG. 1 is a diagram illustrating a schematic configuration of a parking assistance system 1 according to the first embodiment. The parking assistance system 1 is a system for realizing the parking assistance service described above and has a locking and unlocking device 100, a key unit 200, a user terminal 300, an agent terminal 400, a parking assistance service management device (hereinafter, simply referred to as a "center server") 500, and a parking lot management server 600. The user terminal 300, the agent terminal 400, the center server 500, and the parking lot management server 600 are communicably interconnected via a network N. Each of the locking and unlocking device 100 and the key unit 200 is an in-vehicle device 10A provided in a vehicle 10. Each of the user terminal 300 and the agent terminal 400 is a portable terminal such as a smartphone, a tablet computer, a mobile computer, a wearable computer, a wireless storage, a mobile phone, and a handy terminal. The center server 500 and the parking lot management server 600 may be made up of one computer or a plurality of computers.

The network N is a public communication network such as the Internet. The network N may be another communication network such as a wide area network (WAN) as well. The network N may include a telephone network such as a mobile phone network and a wireless communication network such as WiFi.

With the user terminal 300, a parking assistance service user can perform parking assistance use application, parking lot selection, vehicle delivery place confirmation, parking completion report reception, and so on. The above processing may be performed by means of a universal application (mail software or browser software) or a dedicated application.

With the agent terminal 400, an agent who performs parking assistance can be perform parking assistance request reception, vehicle pick-up place confirmation, parking completion reporting, and so on. The above processing may be performed by means of a universal application (mail software or browser software) or a dedicated application. The agent terminal 400 acquires, from the center server 500, authentication information for an operation of the vehicle (such as door locking and unlocking and engine start) when receiving a vehicle parking assistance request.

The center server 500 performs processing related to parking assistance service provision. Examples of the processing include new user registration, user management, service use application reception, parking lot search and reservation, agent assignment, parking assistance request for the agent, parking completion reporting, and authentication information issuance (transmission) to the agent.

The parking lot management server 600 is a system collecting, managing, and providing information related to a plurality of parking lots and reserving a parking lot. By inquiring of the parking lot management server 600, the center server 500 is capable of searching for an empty parking lot in a desired area, acquiring information on the extracted empty parking lot, and reserving a desired parking lot.

The in-vehicle device 10A is configured to include the key unit 200 and the locking and unlocking device 100. The locking and unlocking device 100 is incorporated in the vehicle 10 and physically connected to a control system of the vehicle 10. In contrast, the key unit 200 is not connected to the control system of the vehicle 10 (the key unit 200 is disposed in, for example, a glove compartment or the vehicle). The locking and unlocking device 100 and the key unit 200 perform wireless communication. The key unit 200 has the same wireless interface as a so-called smart key. The key unit 200 communicates with the locking and unlocking device 100. As a result, the vehicle 10 can be locked and unlocked without a physical key. The key unit 200 performs short-range wireless communication with the agent terminal 400. The key unit 200 plays the same role as a smart key in a case where authentication of the agent terminal 400 is successful.

The locking and unlocking device 100 locks and unlocks the doors of the vehicle 10. For example, the locking and unlocking device 100 acquires a key identity (ID) output from a smart key or the key unit 200, and allows the doors of the vehicle 10 to be locked and unlocked in a case where the acquired key ID matches a key ID pre-stored in the locking and unlocking device 100. In a case where door locking and unlocking is allowed, the locking and unlocking device 100 locks and unlocks the doors of the vehicle 10 in response to a user operation on a smart key, a portable terminal, a switch provided on the door of the vehicle 10, or the like. Engine start for the vehicle 10 and the like are also possible through the same processing as the processing for locking and unlocking the doors of the vehicle 10.

The key unit 200 has the same configuration as a smart key of the vehicle 10. The key unit 200 is capable of communicating with a portable terminal (user terminal 300 and agent terminal 400) as well as the locking and unlocking device 100. The key unit 200 acquires authentication information output from the portable terminal and performs authentication using the acquired authentication information. When the authentication is successful, the key unit 200 outputs a key ID of the vehicle 10 pre-stored in the key unit 200. As a result, in the locking and unlocking device 100, a determination is made that the key ID acquired from the key unit 200 matches the key ID pre-stored in the locking and unlocking device 100, and then the doors of the vehicle 10 are allowed to be locked and unlocked. Accordingly, even a person without a smart key can perform locking and unlocking of the doors of the vehicle 10 and so on by using the portable terminal instead of a smart key.

Methods for performing locking and unlocking of the doors of the vehicle 10 and so on by using the portable terminal instead of a smart key are not limited to the method described above. For example, the portable terminal may acquire and output a key ID and the locking and unlocking device 100 may acquire the key ID output from the portable terminal and use the key ID for processing.

A car navigation device 700 is mounted in the vehicle 10. The car navigation device 700 is a device displaying the current position of the vehicle, a path to a destination, a progress situation, and the like on a map and performing guidance to the destination based on information obtained from a satellite positioning system such as a global positioning system (GPS) and a sensor such as a gyro sensor and a vehicle speed sensor. The car navigation device 700 may be a device incorporated in the vehicle 10 or a portable device. In a case where the user terminal 300 is a terminal having the function of a car navigation device (such as a car navigation application-installed terminal), the user terminal 300 can be used as a car navigation device in place of the in-vehicle car navigation device 700.

Device Configuration

Figure 2:
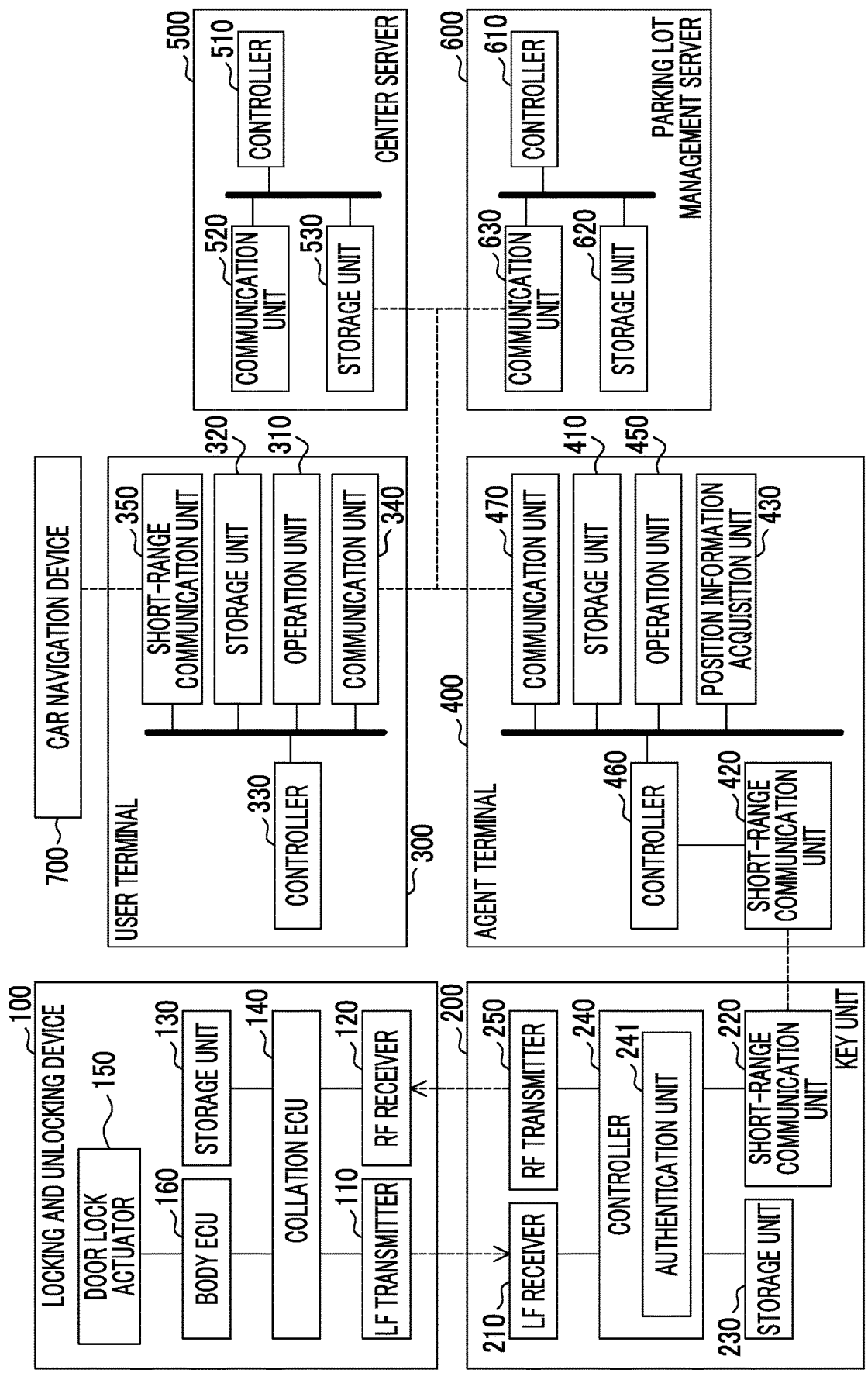
FIG. 2 is a diagram illustrating a schematic configuration of each device of the parking assistance system.

The configuration of each device of the parking assistance system 1 will be described below. Illustrated in FIG. 2 is a schematic configuration example of each device of the parking assistance system 1. The network N illustrated in FIG. 1 is not illustrated in FIG. 2. As illustrated in FIG. 2, the locking and unlocking device 100 has an LF transmitter 110, an RF receiver 120, a storage unit 130, a collation electronic control unit (ECU) 140, a door lock actuator 150, and a body ECU 160. The key unit 200 has an LF receiver 210, a short-range communication unit 220, a storage unit 230, a controller 240, and an RF transmitter 250. The user terminal 300 has an operation unit 310, a storage unit 320, a controller 330, a communication unit 340, and a short-range communication unit 350. The agent terminal 400 has a storage unit 410, a short-range communication unit 420, a position information acquisition unit 430, an operation unit 450, a controller 460, and a communication unit 470. The center server 500 has a controller 510, a storage unit 520, and a communication unit 530. The parking lot management server 600 has a controller 610, a storage unit 620, and a communication unit 630.

Locking and Unlocking Device 100

The configuration of the locking and unlocking device 100 will be described in detail below.

The LF transmitter 110 transmits radio waves in a low frequency (LF) band for detecting (polling) the key unit 200 or a smart key. The LF band is, for example, a frequency band of 100 kHz or more and 300 kHz or less.

The RF receiver 120 receives radio waves in a radio frequency (RF) band transmitted from the key unit 200 or a smart key. The RF band is, for example, a frequency band of 100 MHz or more and 1 GHz or less. The RF receiver 120 receives radio waves indicating, for example, a key ID and locking and unlocking information as an instruction for locking or unlocking of the doors of the vehicle 10.

The storage unit 130 stores various types of information (data) such as the key ID of the vehicle 10, a program executed by the collation ECU 140, and a program executed by the body ECU 160. The storage unit 130 is a semiconductor memory, a magnetic disk, an optical disk, or the like.

The collation ECU 140 analyzes radio waves received by the RF receiver 120. For example, the collation ECU 140 determines whether or not the key ID acquired by the RF receiver 120 matches the key ID of the vehicle 10 pre-stored in the storage unit 130. The collation ECU 140 allows locking and unlocking of the doors of the vehicle 10 in a case where the collation ECU 140 determines that the key ID acquired by the RF receiver 120 matches the key ID pre-stored in the storage unit 130. In a case where door locking and unlocking is allowed, the collation ECU 140 outputs a lock and unlock control signal controlling locking and unlocking of the doors of the vehicle 10 in response to the locking and unlocking information acquired by the RF receiver 120.

The door lock actuator 150 is an actuator (such as a motor) performing locking and unlocking of the doors of the vehicle 10.

The body ECU 160 performs overall control of the vehicle 10. For example, the body ECU 160 drives the door lock actuator 150, such that the doors of the vehicle 10 are locked or unlocked, in accordance with the lock and unlock control signal output from the collation ECU 140. The lock and unlock control signal, a drive signal for driving the door lock actuator 150, and so on are transmitted via an in-vehicle network such as a controller area network (CAN). The collation ECU 140 and the body ECU 160 may be integrally configured.

Key Unit 200

The configuration of the key unit 200 will be described in detail below.

The LF receiver 210 receives the polling signal (RF band radio waves) output from the locking and unlocking device 100 (LF transmitter 110).

The short-range communication unit 220 communicates with a portable terminal (user terminal 300 and agent terminal 400) and acquires authentication information from the portable terminal. For example, the short-range communication unit 220 performs short-range communication in accordance with a predetermined wireless communication standard. Specifically, the short-range communication unit 220 performs communication in accordance with a standard such as the Bluetooth (registered trademark) Low Energy (BLE), the Near Field Communication (NFC), the Ultra-wideband (UWB), and WiFi (registered trademark).

The storage unit 230 stores various types of information (data) such as reference information referred to for authentication using the authentication information, the key ID of the vehicle 10, and a program executed by the controller 240. The storage unit 230 is a semiconductor memory, a magnetic disk, an optical disk, or the like.

The controller 240 is a processor (central processing unit (CPU)) or a digital signal processor (DSP)) performing overall control of the key unit 200. The controller 240 has an authentication unit 241. The authentication unit 241 performs authentication using the authentication information acquired by the short-range communication unit 220. When the authentication by the authentication unit 241 is successful, the controller 240 instructs the RF transmitter 250 to output the key ID and the locking and unlocking information. The controller 240 may or may not realize various functions including the authentication unit 241 by reading and executing the program pre-stored in the storage unit 230. The various functions including the authentication unit 241 may be realized by hardware as well.

The authentication unit 241 determines that the authentication is successful in a case where the authentication information acquired by the short-range communication unit 220 satisfies a predetermined condition. The authentication unit 241 determines that the authentication is unsuccessful in a case where the authentication information acquired by the short-range communication unit 220 does not satisfy the predetermined condition. The predetermined condition is, for example, any one of the following conditions 1 to 3.

Condition 1: The authentication information matches the reference information.

Condition 2: The result of predetermined processing (such as encryption processing and decryption processing) performed on one of the authentication information and the reference information matches the other of the authentication information and the reference information.

Condition 3: The result of predetermined processing (such as encryption processing and decryption processing) performed on the authentication information matches the result of the processing performed on the reference information.

The RF transmitter 250 transmits radio waves (RF band radio waves) indicating the key ID and the locking and unlocking information in response to the instruction from the controller 240. Specifically, the RF transmitter 250 transmits radio waves indicating the key ID of the vehicle 10 pre-stored in the storage unit 230, radio waves indicating the locking and unlocking information generated by the controller 240, or radio waves indicating both the key ID and the locking and unlocking information. Methods for acquiring the key ID and the locking and unlocking information are not particularly limited. For example, an encryption key ID (encrypted key ID) may be stored in advance in the storage unit 230, and a key ID (unencrypted key ID; decryption key ID) may be generated by the controller 240 applying decryption processing using the authentication information to the encryption key ID. The short-range communication unit 220 may acquire the locking and unlocking information output from a portable terminal.

User Terminal 300

The configuration of the user terminal 300 will be described in detail below. The operation unit 310 receives a user operation on the user terminal 300. For example, the operation unit 310 receives an operation for parking assistance use application, a parking lot selection operation, and the like. The storage unit 320 stores various types of information (data) such as information acquired by the user terminal 300 and a program executed by the controller 330. The storage unit 320 is a semiconductor memory, a magnetic disk, an optical disk, or the like. The controller 330 is a processor (CPU or DSP) performing overall control of the user terminal 300. The processing and function of the user terminal 300 are realized by the controller 330 reading and executing the program stored in the storage unit 320. The communication unit 340 performs communication (data transmission and reception) with the center server 500. The short-range communication unit 350 performs short-range communication in accordance with a predetermined wireless communication standard (BLE, NFC, UWB, WiFi, or the like). The user terminal 300 is capable of communicating with the car navigation device 700 by using short-range communication.

Agent Terminal 400

The configuration of the agent terminal 400 will be described in detail below. The storage unit 410 stores various types of information (data) such as information (request information and authentication information) acquired by the agent terminal 400 and a program executed by the controller 460. The short-range communication unit 420 communicates with the key unit 200 (short-range communication unit 220). For example, the short-range communication unit 420 performs short-range communication in accordance with a predetermined wireless communication standard (BLE, NFC, UWB, WiFi, or the like).

After parking of the vehicle 10 is completed, the position information acquisition unit 430 acquires position information related to the parking position of the vehicle 10. In the first embodiment, the position information acquisition unit 430 is a receiver of a satellite positioning system such as a GPS and acquires, as the position information, information (latitude information, longitude information, and the like) obtained by the satellite positioning system. The position information may include information other than the information obtained by the satellite positioning system as well.

The operation unit 450 receives a user operation on the agent terminal 400. The operation unit 450 receives, for example, a completion operation for notifying the center server 500 or the agent terminal 400 of parking assistance completion. The controller 460 is a processor (CPU or DSP) performing overall control of the agent terminal 400. The processing and function of the agent terminal 400 are realized by the controller 460 reading and executing the program stored in the storage unit 410. The communication unit 470 communicates with the center server 500.

Center Server 500

The center server 500 will be described below. The center server 500 is made up of a general computer. The center server 500 is a computer that has a processor (not illustrated) such as a CPU and a DSP, a main storage unit (not illustrated) such as a random access memory (RAM) and a read only memory (ROM), and an auxiliary storage unit (not illustrated) such as an erasable programmable ROM (EPROM), a hard disk drive (HDD), and removable media. The removable media are disk recording media such as a universal serial bus (USB) memory, a compact disc (CD), and a digital versatile disc (DVD). An operating system (OS), various programs, various tables, and the like are stored in the auxiliary storage unit. A function that meets a predetermined purpose can be realized when the program stored in the auxiliary storage unit is loaded onto a work region of the main storage unit and executed and each component or the like is controlled through the program execution.

The center server 500 has a user information DB storing various types of information in the storage unit 520. The database (DB) is built by a program of a database management system executed by the processor managing the data stored in the auxiliary storage unit. The user information DB is, for example, a relational database.

The user information DB is a database that manages information on a registered parking assistance service user. Illustrated in FIG. 3 is an example of the information registered in the user information DB. Stored in the user information DB are, for example, information used for authentication during user access to the center server 500 (user ID, password, and the like), information on the user's vehicle 10 (vehicle type, color, number, vehicle identification number, and the like), information on the key unit 200 installed in the vehicle (identification information specifying the key unit 200, authentication information stored in the key unit 200 (encryption key), and the like), and authentication information (public key and the like). Also storable as information additional to the authentication information is information such as the valid period (including the valid time slot) of the authentication information and whether the authentication information has become invalid.

The controller 510 of the center server 500 performs control such as new user registration, user information change, authentication information issuance (generation), and authentication information transmission to the agent terminal 400. The authentication information issuance processing may be performed by the center server 500 or an authentication information issuing server (not illustrated).

The new user registration with respect to the center server 500 is performed in, for example, the following manner. A new user accesses a user registration site provided by the center server 500 by using a portable terminal, a personal computer, or the like. Then, a user ID is issued once a new registration screen is input with, for example, personal information on the user (name, address, telephone number, mail address, password, and the like), information on the vehicle to be registered (vehicle type, color, number, vehicle identification number, and the like), and information on the key unit installed in the vehicle to be registered. Upon the new user and vehicle (key unit) registration, the center server 500 issues (generates) authentication information based on the information of the key unit and registers the information in the user information DB. In a case where authentication information corresponding to the key unit is already issued by the center server 500 or another server, the center server 500 may acquire the issued authentication information and store the information in the user information DB. Subsequently, the user can access the center server 500 with the user ID and the password and can use, for example, the parking assistance service using the authentication information. The vehicle information such as the type, color, and number of the vehicle is information useful when, for example, the agent visually locates the vehicle, and thus the registration of the vehicle information is desirable. Still, the registration is optional. In the first embodiment, it is assumed that the registration processing is performed by the user. In a case where key unit installation is performed before vehicle delivery, however, the user registration and the authentication information issuance processing may be performed at a car dealership or a factory.

Parking Lot Management Server 600

The parking lot management server 600 has the configuration of a general computer. The parking lot management server 600 is identical to the center server 500 in basic hardware configuration. The parking lot management server 600 has a processor (not illustrated), a main storage unit (not illustrated), and an auxiliary storage unit (not illustrated). Accordingly, a function that meets a predetermined purpose can be realized when the program stored in the auxiliary storage unit is loaded onto a work region of the main storage unit and executed by the processor and each component or the like is controlled through the program execution.

The parking lot management server 600 has a parking lot information DB storing various types of information in the storage unit 620. The database (DB) is built by a program of a database management system executed by the processor managing the data stored in the auxiliary storage unit. The parking lot information DB is, for example, a relational database.

The parking lot information DB is a database that manages information on a plurality of parking lots available for the parking assistance service. Illustrated in FIG. 4 is an example of the information registered in the parking lot information DB. Included as the parking lot information are, for example, parking lot names, parking fees, parking lot positions (latitudes, longitudes, addresses, and the like), parking lot sizes (numbers of parking spaces), parking lot types (flat/three-dimensional, self-traveling/mechanical, outdoor/indoor, and the like), parkable vehicle sizes (widths, lengths, and heights), information on empty parking spaces, and parking lot images and videos. The information on empty parking spaces may include information on parking spaces to become empty in the future (that is, a parking lot reservation situation) as well as information on currently empty parking spaces. The parking lot management server 600 regularly collects the information on empty parking spaces and the reservation situation from the management device of each parking lot, and the information and the situation are written in the parking lot information DB by the parking lot management server 600.

Operation of Parking Assistance System 1

Figure 5:
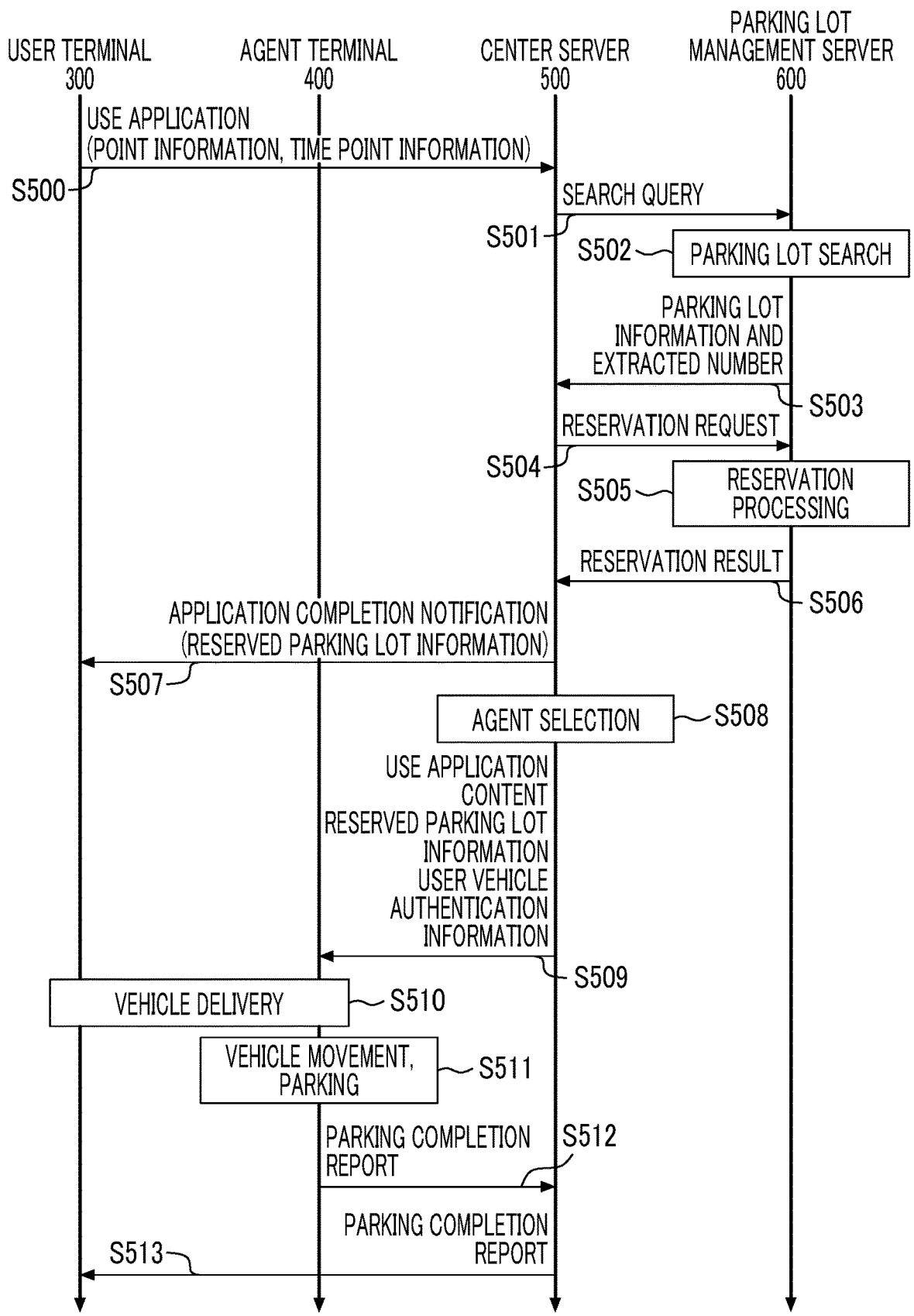
FIG. 5 is a diagram illustrating an operation of the parking assistance system according to the first embodiment.

An operation of the parking assistance system 1 will be described with reference to FIG. 5.

The user applies for parking assistance from the user terminal 300 (step S500). Specifically, the user operates a predetermined application operating on the user terminal 300, inputs the date, time, and place of use of the parking assistance service, and presses the use application button. Then, a use application including information on the date and time of use (hereinafter, also referred to as "time information") and information on the place of use (hereinafter, also referred to as "point information") is transmitted to the center server 500. Designatable in the place of use are, for example, the user's planned destination to reach, the user's current location, and a desired place where the vehicle is to be picked up by the agent. Usable as the point information is, for example, information such as an address, mapped coordinates, a latitude, a longitude, and a landmark name. Information other than the time information and the point information also may be included in the use application. For example, the use application may include a parking lot condition such as the upper limit distance from the vehicle delivery place to the parking lot, a parking fee, the ease of parking (parking space and passage sizes), the presence or absence of a roof, and a parkable size.

Upon receiving the use application, the center server 500 generates a search query and transmits the search query to the parking lot management server 600 (step S501). The search query is to extract a parking lot that is present within a predetermined range (for example, an area within a radius of 1 km from the place of use) with respect to the place of use and has an empty parking space at the date and time indicated by the time information. In a case where the above-described parking lot condition is included in the use application, the above-described parking lot condition may be included in the search query.

Upon receiving the search query, the parking lot management server 600 searches the parking lot information DB for a parking lot matching the condition (step S502). Subsequently, the parking lot management server 600 returns the number of extracted parking lots and information on the extracted parking lots to the center server 500 as a search result (step S503). In a case where no parking lot matches the condition, the parking lot management server 600 may return a result of zero extraction or may return information on the parking lot that is closest to the condition.

Upon receiving the search result, the center server 500 generates a reservation request and transmits the reservation request to the parking lot management server 600 (step S504). The reservation request is to reserve a parking space in the extracted parking lot for the date and time of use. In a case where the search result includes information on a plurality of parking lots (in a case where the number of extractions exceeds 1), the center server 500 may select the parking lot that is closest to the place of use among the parking lots and send the reservation request. The parking lot management server 600 executes parking lot reservation processing in accordance with the reservation request (step S505) and returns the result of the reservation (success or failure of the reservation) to the center server 500 (step S506). In the case of reservation establishment, the center server 500 generates reserved parking lot information indicating the reserved parking lot and transmits the reserved parking lot information and an application completion notification to the user terminal 300 (step S507). In addition, the center server 500 selects an agent in charge of parking assistance for the vehicle from a plurality of pre-registered agents (step S508) and transmits, to the agent terminal 400 of the selected agent, the content of the use application (date, time, and place of use), the reserved parking lot information, and authentication information regarding the user's vehicle (step S509). In the case of reservation non-establishment, the center server 500 may start over from the parking lot search (step S501).

Figure 6:
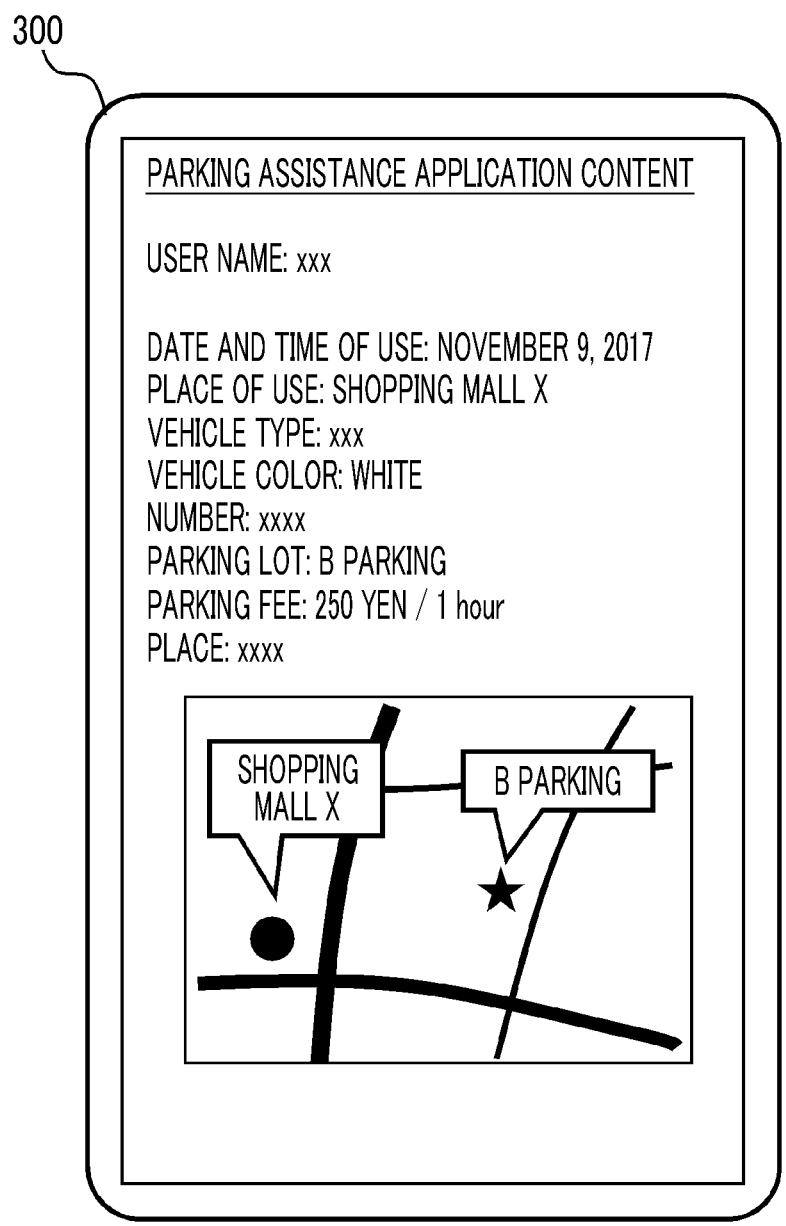
FIG. 6 is a diagram illustrating an example of an application content confirmation screen displayed on a user terminal.

FIG. 6 is an example of an application content confirmation screen displayed on the user terminal 300. Displayed on the application content confirmation screen are, for example, the date and time of use, the place of use, vehicle information, and reserved parking lot information. On the application content confirmation screen, the user can confirm, for example, the date, time, and place of vehicle delivery to the agent and the name, position, and fee of the parking lot where the vehicle is to be parked. The place of use (user's destination) and the place of the parking lot are shown on the map, and the positional relationship between the two can be confirmed.

Subsequently, the user drives the vehicle, moves to the place of use by the date and time of use, and hands the vehicle over to the agent (step S510). At this time, the vehicle delivery may be performed with the user and the agent face to face with each other or the agent may come and pick up the vehicle after the user stops the vehicle at the place of use. The agent unlocks the vehicle and starts the engine by using the authentication information of the agent terminal 400, drives the vehicle, and moves the vehicle to the reserved parking lot (step S511). After parking completion, the agent locks the vehicle by using the agent terminal 400. Then, a parking completion report is sent to the center server 500 (step S512). The center server 500 notifies the user terminal 300 of the parking completion report (step S513). As a result, the sequential processing of the parking assistance service is completed.

In the first embodiment, of the functions provided by the center server 500, the function of receiving the use application from the user terminal 300 is an example of a use application reception unit. The function of sending the search query to the parking lot management server 600 and acquiring the search result is an example of a parking lot extraction unit. The function of sending the reservation request to the parking lot management server 600 is an example of a reservation unit. The function of sending the reserved parking lot information to the user terminal 300 and the agent terminal 400 is an example of an information notification unit.

In the parking assistance system according to the first embodiment described above, a parking lot near the place of use of the parking assistance service is extracted and a parking space is reserved for a scheduled date and time of use once the center server 500 receives the use application from the user. Accordingly, on the agent's (parking assistance service provider's) part, the system is advantageous in that a parking lot can be appropriately searched for and reservation processing can be expedited and carried out in a labor-saving manner. In addition, the agent and the user are automatically notified of information on the reserved parking lot, and thus convenience is provided for the agent and the user alike.

Second Embodiment

In a second embodiment, cooperation between the parking assistance system 1 and the car navigation device 700 will be described. The following description will focus on differences from the first embodiment, and description of the same configurations as in the first embodiment will be omitted.

Figure 7:
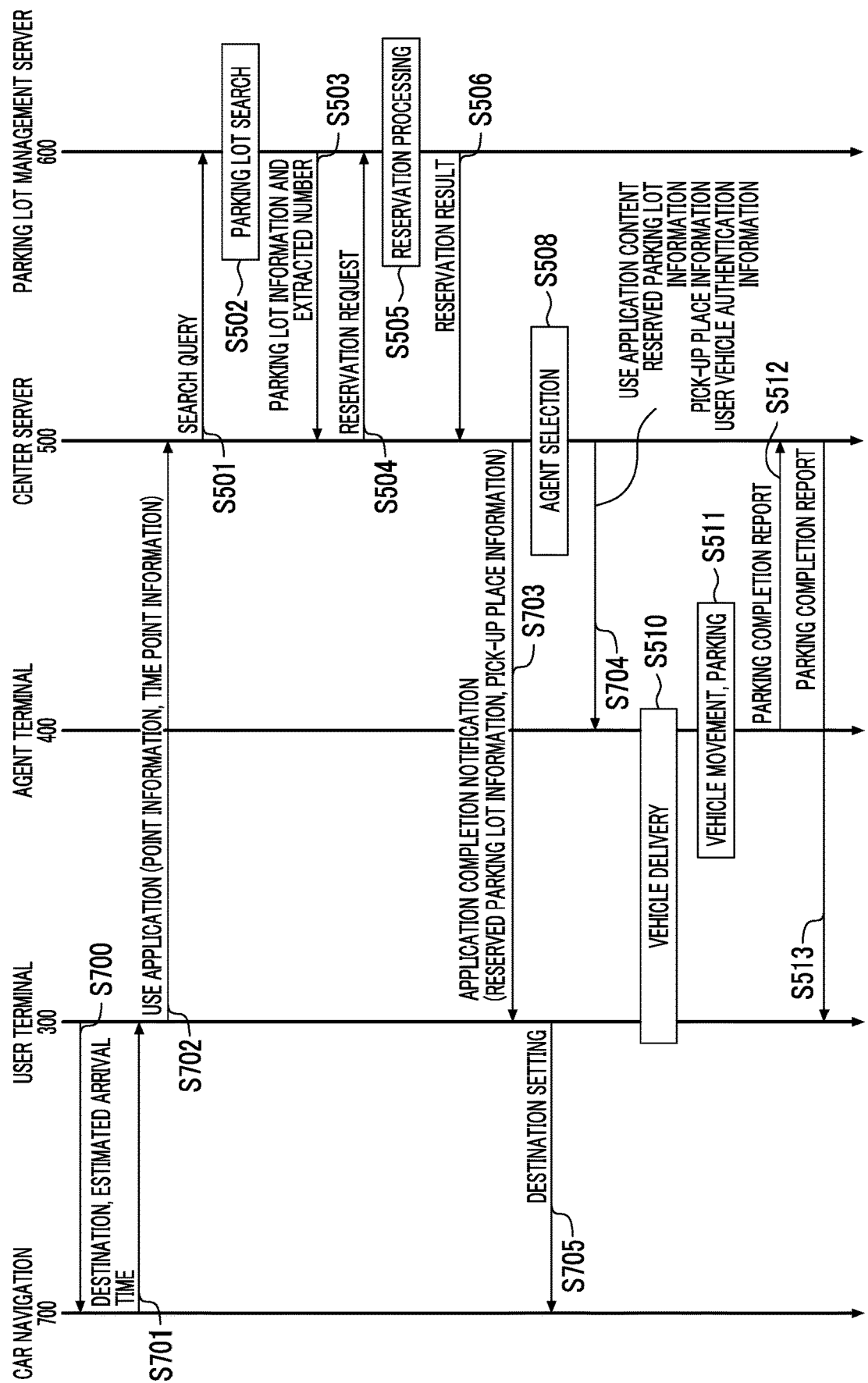
FIG. 7 is a diagram illustrating an operation of a parking assistance system according to a second embodiment.

Illustrated in FIG. 7 is an operation of the parking assistance system 1 according to the second embodiment. In the processing that is illustrated in FIG. 7, the same step numbers as in FIG. 5 are assigned to the same processing as in the processing according to the first embodiment (FIG. 5). Assumed here is a scene in which a user applies for the parking assistance service while heading towards (or setting off for) a destination in accordance with guidance provided by the car navigation device 700.

Once the user operates a predetermined application operating on the user terminal 300 and presses the use application button, the user terminal 300 communicates with the car navigation device 700 (step S700) and acquires destination information and information on estimated arrival time from the car navigation device 700 (step S701). The user terminal 300 generates a use application including the destination information (point information) and the information on the estimated arrival time (time information) and transmits the use application to the center server 500 (step S702). As in the first embodiment, the use application may include a parking lot condition input by the user.

Use application-based parking lot search and reservation processing (steps S501 to S506) is the same as the processing according to the first embodiment. In the case of parking lot reservation establishment, the center server 500 generates reserved parking lot information indicating the reserved parking lot, generates pick-up place information indicating a place where the agent is to pick up the vehicle, and transmits an application completion notification, the reserved parking lot information, and the pick-up place information to the user terminal 300 (step S703). In addition, the center server 500 selects an agent in charge of parking assistance for the vehicle from a plurality of pre-registered agents (step S508) and transmits, to the agent terminal 400 of the selected agent, the content of the use application (date, time, and place of use), the reserved parking lot information, the pick-up place information, and authentication information regarding the user's vehicle (step S704).

The vehicle pick-up place may be decided on in view of a condition such as the place being suitable for temporary vehicle stopping, the place being close to the user's destination, the destination being easily reachable (by means of another moving means or the like), the place being close to the reserved parking lot, and both the user's and the agent's movement loss being small. In a case where the destination is a shopping mall and there is a temporary stop at the entrance of the shopping mall, for example, the temporary stop of the shopping mall may be set as the pick-up place (in this case, the destination is the pick-up place). Alternatively, a place near the shopping mall where the vehicle can be stopped may be set as the pick-up place (in this case, the destination is not the pick-up place).

Figure 8:
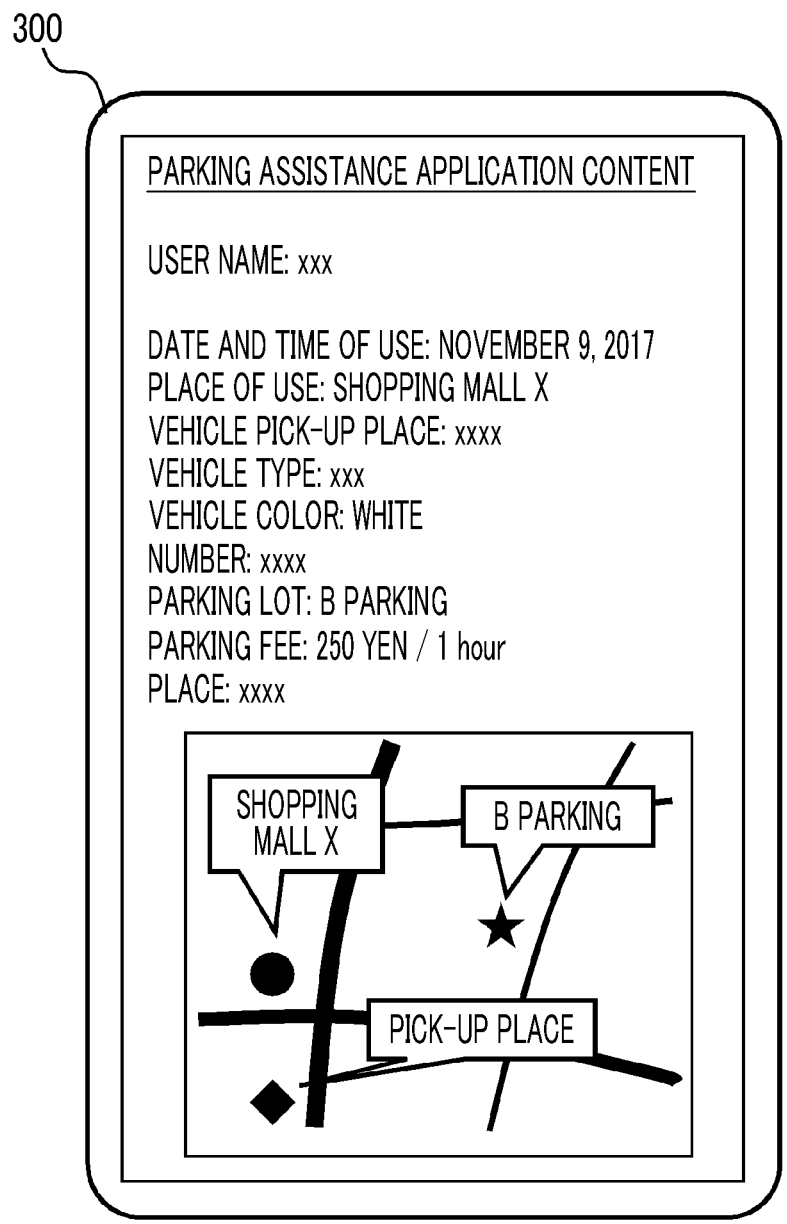
FIG. 8 is a diagram illustrating an example of the application content confirmation screen displayed on the user terminal.

FIG. 8 is an example of the application content confirmation screen displayed on the user terminal 300. Displayed on the application content confirmation screen are, for example, the date and time of use, the place of use, a vehicle pick-up place, vehicle information, and reserved parking lot information. On the application content confirmation screen, the user can confirm, for example, the date, time, and place of vehicle delivery to the agent and the name, position, and fee of the parking lot where the vehicle is to be parked. The place of use (user's destination), the place of the parking lot, and the vehicle pick-up place are shown on the map, and the positional relationship of the three places can be confirmed.

Upon receiving the pick-up place information from the center server 500, the user terminal 300 sends a destination setting command to the car navigation device 700 (step S705) and adds the vehicle pick-up place to the car navigation device 700 as a destination or a waypoint. As a result, the user can move to the vehicle pick-up place in accordance with guidance provided by the car navigation device 700. The subsequent processing is the same as in the first embodiment.

According to the configuration of the second embodiment described above, information on the destination, the current location, and the date and time of use is acquired from the car navigation device 700, and thus there is no need for the user to input the information and the use application is improved in terms of operability and convenience. In addition, the user and the agent are notified of the vehicle pick-up place information, and thus certainty can be ensured for vehicle delivery between the user and the agent. Further, in the above-described configuration, the vehicle pick-up place is automatically set as a destination or a waypoint in the car navigation device 700, and thus (the vehicle of) the user can be guided to the vehicle pick-up place, which is highly convenient. The vehicle pick-up place notification and car navigation are especially useful in a case where a destination is not a vehicle pick-up place.

Third Embodiment

In a third embodiment, an example in which a user is allowed to select a parking lot will be described. The following description will focus on differences from the first embodiment, and description of the same configurations as in the first embodiment will be omitted.

Figure 9:
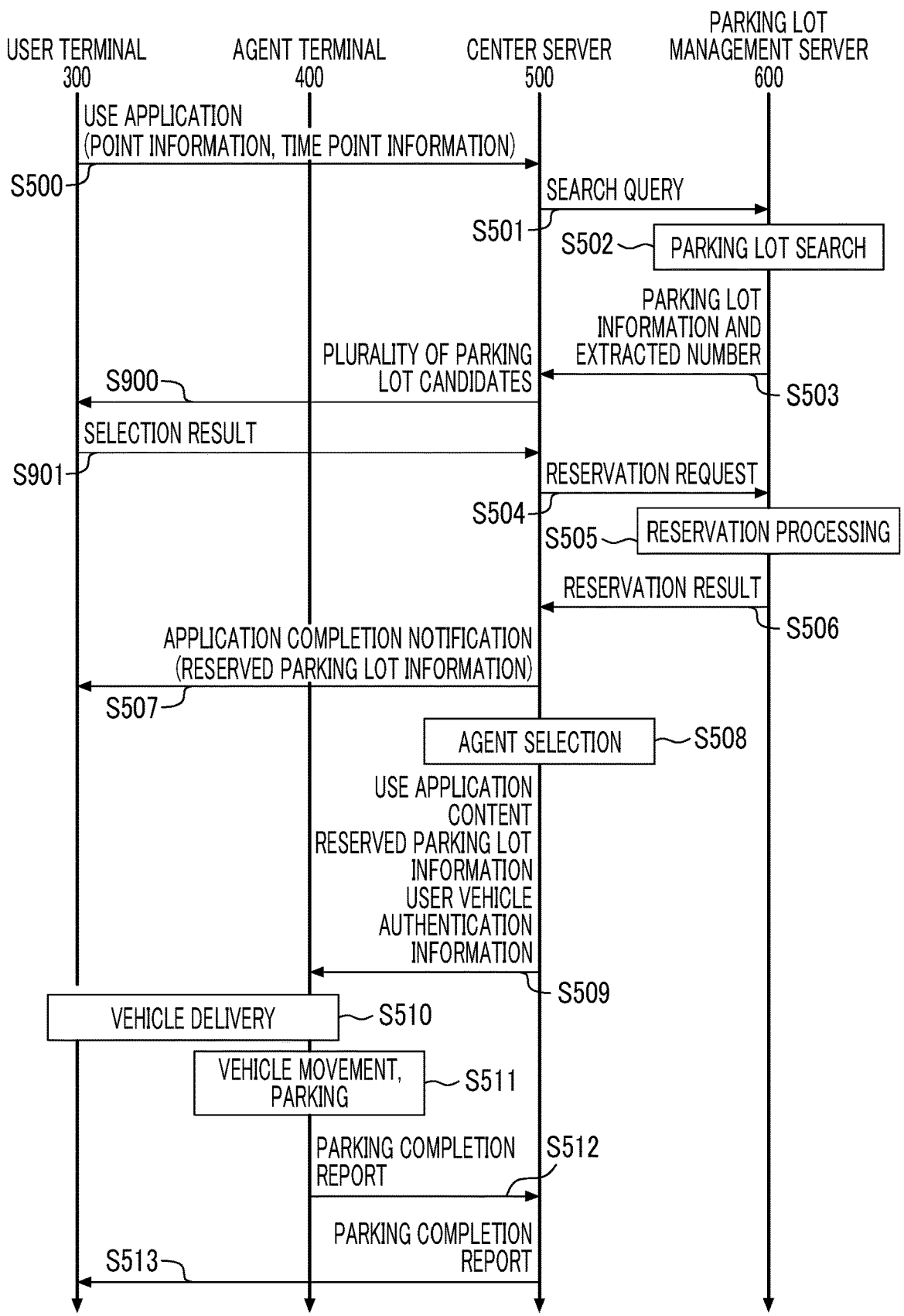
FIG. 9 is a diagram illustrating an operation of a parking assistance system according to a third embodiment.

Illustrated in FIG. 9 is an operation of the parking assistance system 1 according to the third embodiment. In the processing that is illustrated in FIG. 9, the same step numbers as in FIG. 5 are assigned to the same processing as in the processing according to the first embodiment (FIG. 5).

The processing from use application to parking lot search (steps S500 to S503) is the same as in the first embodiment. Upon receiving the search result from the parking lot management server 600, the center server 500 changes the processing in accordance with the number of extracted parking lots. In the case of single parking lot extraction (in a case where the extracted number is 1), a request is made for the extracted parking lot to be reserved as in the first embodiment (see FIG. 5). In a case where a plurality of parking lots has been extracted (in a case where the number of extractions exceeds 1), the center server 500 transmits information on the parking lot candidates to the user terminal 300 (step S900) so that the user selects a desired parking lot (step S901).

Figure 10:
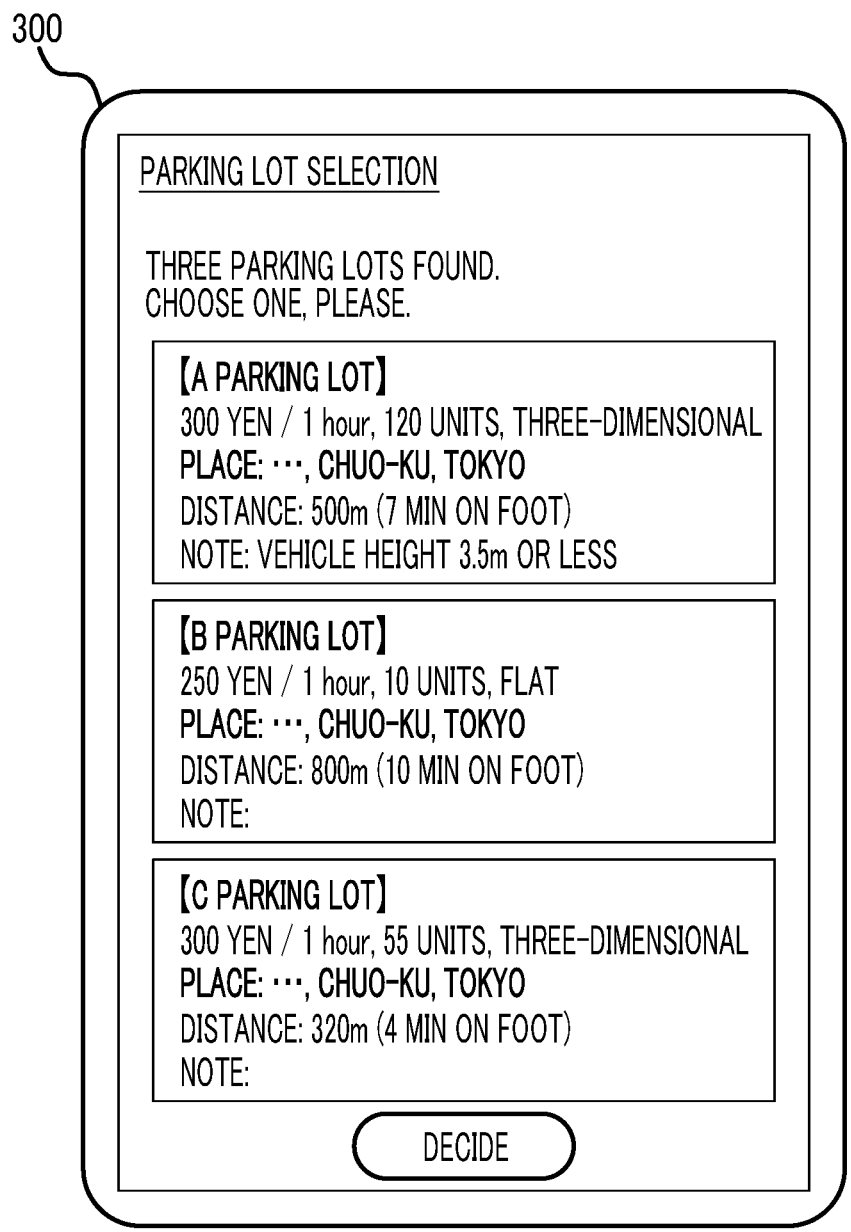
FIG. 10 is a diagram illustrating an example of a parking lot selection screen displayed on the user terminal.

FIG. 10 is an example of the parking lot selection screen that is displayed on the user terminal 300. Displayed in the parking lot selection screen example is information regarding three parking lot candidates such as parking lot names, parking fees, parking lot positions, the distances from the place of use, and the types of the parking lots. The user can select a desired parking lot from the three parking lot candidates.

Upon receiving the selection result from the user terminal 300, the center server 500 generates a reservation request and transmits the reservation request to the parking lot management server 600 (step S504). The reservation request is to reserve a parking space in the selected parking lot for the date and time of use. The subsequent processing is the same as in the first embodiment.

Conditions on which users select parking lots are not limited to "proximity". The conditions differ from person to person, and examples of the conditions include parking fees, the ease of parking, and the presence or absence of a roof. Accordingly, a final decision on parking lots made by a user as in the third embodiment is expected to add to his or her satisfaction and sense of security, and to help the user feel at ease.

Others

The present embodiments merely exemplify some specific examples of the disclosure. The disclosure is not limited to the present embodiments, and various modifications are possible within the scope of the technical idea of the disclosure.

For example, it is desirable that the user selects a parking lot as in the third embodiment even in a case where a plurality of parking lot candidates is extracted in the second embodiment. Although the vehicle pick-up place is displayed on the confirmation screen of the user terminal 300 and set as a destination in the car navigation device 700 in the second embodiment, either one may be enough alone as well. Although the user terminal 300 and the car navigation device 700 are different devices in the second embodiment, also adoptable is a configuration in which the user terminal 300 serves as a car navigation device as well or a configuration in which the car navigation device 700 serves as a user terminal as well. Assumed as the former example is an example in which the user terminal 300 is a smartphone on which parking assistance service and car navigation applications are installed. Assumed as the latter example is an example in which the in-vehicle car navigation device 700 has a parking assistance service function and parking assistance use application and so on are performed through an operation on the screen of the car navigation device 700.

What is claimed is:

1. A parking assistance service management device supporting a parking assistance service as a service in which an agent moves a vehicle to a parking lot and parks the vehicle in the parking lot on behalf of a user, the parking assistance service management device comprising:
at least one processor configured to:
receive, from a terminal of the user of the parking assistance service, a use request for using the parking assistance service, the use request including point information representing a point of use of the parking assistance service and time information representing a date and time of use of the parking assistance service;
extract, in response to the use request, from a plurality of parking lots, a parking lot that is present within a predetermined range from the point represented by the point information and has an empty parking space at the date and time represented by the time information;
select, among a plurality of agents, an agent of the parking assistance service that is present within the predetermined range from the point represented by the point information;
reserve a parking space in the extracted parking lot for the date and time represented by the time information;
notify a terminal of the selected agent of the parking assistance service of reserved parking lot information indicating the reserved parking space in the extracted parking lot;
transmit content of the use request to the terminal of the selected agent, and
transmit authentication information associated with an operation of the vehicle to the terminal of the selected agent, the operation of the vehicle being at least one of (i) unlocking a door and (ii) starting an engine; and
notify the terminal of the user of the reserved parking lot information indicating the reserved parking space in the extracted parking lot.

2. The parking assistance service management device according to claim 1, wherein the point information is information representing any one of a destination towards which the user heads, a current location of the user, and a vehicle pick-up place desired by the user.

3. The parking assistance service management device according to claim 2, wherein:
the terminal of the user has a function of a car navigation device or is a terminal communicable with a car navigation device mounted in the vehicle; and
the information on at least one of the destination towards which the user heads and the current location of the user is acquired from the car navigation device.

4. The parking assistance service management device according to claim 1, wherein the at least one processor is configured to notify the terminal of the user of pick-up place information indicating a vehicle pick-up place at which the vehicle is to be picked up.

5. The parking assistance service management device according to claim 4, wherein:
the terminal of the user is a terminal having a function of a car navigation device or a terminal communicable with a car navigation device mounted in the vehicle; and
the at least one processor is configured to add the vehicle pick-up place to the car navigation device as a destination or a waypoint by notifying the terminal of the user of the pick-up place information.

6. The parking assistance service management device according to claim 1, wherein, when a plurality of parking lot candidates satisfies a condition of being present within the predetermined range from the point represented by the point information and having the empty parking space at the date and time represented by the time information, the at least one processor is configured to provide the terminal of the user with information on the parking lot candidates and allows the user to select a desired parking lot.

7. The parking assistance service management device according to claim 6, wherein the information on the parking lot candidates includes at least one of names of the parking lots, parking fees, positions of the parking lots, and distances between the parking lots and the point represented by the point information.

8. A control method, comprising:
receiving, from a terminal of a user of a parking assistance service that is a service in which an agent moves a vehicle to a parking lot and parks the vehicle in the parking lot on behalf of a user, a use request for using the parking assistance service, the use request including point information representing a point of use of the parking assistance service and time information representing a date and time of use of the parking assistance service;
extracting, in response to the use request, from a plurality of parking lots, a parking lot that is present within a predetermined range from the point represented by the point information and has an empty parking space at the date and time represented by the time information;
selecting, among a plurality of agents, an agent of the parking assistance service that is present within the predetermined range from the point represented by the point information;
reserving a parking space in the extracted parking lot for the date and time represented by the time information;
notifying a terminal of the selected agent of the parking assistance service of reserved parking lot information indicating the reserved parking space in the extracted parking lot;
transmitting content of the use request to the terminal of the selected agent;
transmitting authentication information associated with an operation of the vehicle to the terminal of the selected agent, the operation of the vehicle being at least one of (i) unlocking a door and (ii) starting an engine; and
notifying the terminal of the user of the reserved parking lot information indicating the reserved parking space in the extracted parking lot.

9. A non-transitory computer-readable storage medium storing a program for causing a computer to execute the control method according to claim 8.

10. A control method, comprising:
acquiring, from a car navigation device, information on a destination towards which a user heads or a current location of the user;
generating a use request for using a parking assistance service that is a service in which an agent moves a vehicle to a parking lot and parks the vehicle in the parking lot on behalf of a user, the use request including (i) the information on the destination towards which the user heads or the current location of the user and (ii) point information representing a point of use of the parking assistance service;
transmitting the use request to a parking assistance service management device that supports the parking assistance service; and receiving a parking completion report indicating that the agent has successfully parked the vehicle in the parking lot on behalf of the user, wherein the parking assistance service management device selects the agent from a plurality of agents that is within a predetermined range from the point represented by the point information, wherein the parking lot is located within the predetermined range, and wherein the parking assistance service management device transmits, to a terminal of the selected agent, authentication information associated with an operation of the vehicle, the operation of the vehicle being at least one of (i) unlocking a door and (ii) starting an engine.

11. A non-transitory computer-readable storage medium storing a program for causing a computer to execute the control method according to claim 10.

12. A control method, comprising:

generating a use request for using a parking assistance service that is a service in which an agent moves a vehicle to a parking lot and parks the vehicle in the parking lot on behalf of a user, the use request including point information and time information;

transmitting the use request to a parking assistance service management device that supports the parking assistance service;

receiving information related to a reserved parking lot extracted from a plurality of parking lots based on the point information and the time information from the parking assistance service management device; and displaying the use request and the reserved parking lot at a user terminal that is communicable via a network with the parking assistance service management device, wherein the parking assistance service management device selects the agent from a plurality of agents that is within a predetermined range from the point represented by the point information, wherein the parking lot is located within the predetermined range, and wherein the parking assistance service management device transmits, to a terminal of the selected agent, authentication information associated with an operation of the vehicle, the operation of the vehicle being at least one of (i) unlocking a door and (ii) starting an engine.

13. A non-transitory computer-readable storage medium storing a program for causing a computer to execute the control method according to claim 12.

14. The parking assistance service management device according to claim 1, wherein the at least one processor is configured to send a parking completion report indicating that the agent has successfully parked the vehicle in the parking lot on behalf of the user to the terminal of the user.

15. The control method according to claim 8, further comprising sending a parking completion report indicating that the agent has successfully parked the vehicle in the parking lot on behalf of the user to the terminal of the user.

16. The control method according to claim 12, further comprising receiving a parking completion report indicating that the agent has successfully parked the vehicle in the parking lot on behalf of the user.

17. The control method according to claim 12, further comprising displaying the use request and the reserved parking lot simultaneously at the user terminal.

* * * * *